United States Patent

[11] 3,622,609

| [72] | Inventors | Vladimir Florovich Mironov<br>ul. Gubkina, 4, kv. 13;<br>Vadim Lvovich Kozlikov, Novye<br>Cheremushki, Korpus 19, kv. 15, both of<br>Moscow, U.S.S.R. |
|------|-----------|---|
| [21] | Appl. No. | 754,449 |
| [22] | Filed | Aug. 21, 1968 |
| [45] | Patented | Nov. 23, 1971 |
| [32] | Priority | Aug. 23, 1967 |
| [33] |  | U.S.S.R. |
| [31] |  | 1182274 |

[54] METHOD OF PREPARING 1,3-BIS/HYDROXYALKYL(ARYL)/-TETRAORGANODISILOXANES
13 Claims, No Drawings

[52] U.S. Cl. .................................................. 260/448.2 E
[51] Int. Cl. ..................................................... C07f 7/08
[50] Field of Search ............................................ 260/448.2 E

[56] References Cited
UNITED STATES PATENTS

| 2,924,588 | 2/1960 | Speier ........................ | 260/448.2 X |
| 3,442,925 | 5/1969 | Simmler et al. .............. | 260/448.2 (E) |
| 3,446,830 | 5/1969 | Niederprum et al. ......... | 260/448.2 (E) |

*Primary Examiner*—Tobias E. Levow
*Assistant Examiner*—P. F. Shaver
*Attorney*—Waters, Roditi, Schwartz & Nissen

ABSTRACT: Carbofunctional diols of the disiloxane series are prepared by reacting organohalosilanes with unsaturated alcohols in the presence of a tertiary amine as hydrogen chloride acceptor, and in an organic solvent medium, subjecting the resultant alkenyloxydiorganosilanes to polymerization in the presence of a hydrosilylation catalyst, boiling the mixture of siloxyalkanes thus obtained with an alkaline solution, and thereafter separating the desired product.

METHOD OF PREPARING 1,3-BIS/HYDROXYALKYL(ARYL)/-TETRAORGANODISILOXANES

SUMMARY

This invention relates to methods of preparing carbofunctional diols of the disiloxane series.

The method comprises reacting organohalosilanes with unsaturated alcohols in the presence of a tertiary amine as hydrogen chloride acceptor, and in an organic solvent medium, subjecting the resultant alkenyloxydiorganosilanes to polymerization in the presence of a hydrosilylation catalyst, boiling the mixture of siloxyalkanes thus obtained with an alkaline solution, and thereafter separating the sought-for product.

This invention relates to methods of preparing carbofunctional diols of the disiloxane series and, more particularly, to a method of producing 1,3-bis-/hydroxyalkyl(aryl)/-tetraorganodisiloxanes, which compounds find application for the synthesis of polycarbonates, polyurethanes, polyesters or epoxy resins and are likewise useful as antifoams and pore size regulators.

It is known to prepare 1,3-bis-(hydroxylakyl)-tetraorganodisiloxanes by the organometallic technique according to the following schematic reaction:

$$R_2Si\text{-}O(CH_2)_nCl \xrightarrow{Me} R_2Si\text{-}O\text{-}(CH_2)_n \xrightarrow{H_2O}$$

with $CH_3$ groups on Si, yielding $$\left[ HO(CH_2)_nSi(CH_3)(R_2) \right]_2 O$$

wherein: $n=3\text{-}5$; $Me=Mg, Li, Na$; $R_2=CH_3, C_6H_5$.

This known method suffers from the drawback of requiring the use of starting compounds which call for an elaborate procedure for their preparation. Another limitation is associated with the employment of alkali metals, which results in the formation of byproducts and decreased yields of the desired compounds.

It is also known to prepare the aforesaid compounds by subjecting appropriate diacetates to transesterification $$\left[ CH_3OCO(CH_2)_3Si(CH_3)(CH_3) \right]_2 O \xrightarrow{CH_3OH}$$

$$\left[ HO(CH_2)_3Si(CH_3)(CH_3) \right]_2 O + CH_3COOCH_3$$

The latter method is disadvantageous in that it is a multistage process. A further disadvantage is that the transesterification of acetates proceeds at a very slow rate at room temperature, whilst carrying out the transesterification at elevated temperatures is to be avoided, insofar as there occurs the dehydration of the diol obtained.

It is an object of the present invention to eliminate the aforesaid disadvantages.

It is a further and more specific object of the present invention to provide a simple and efficient method which will make it possible to obtain the desired compounds in a yield of 80–95 percent of the theoretical amount.

These objects have been accomplished by the provision of a method for preparing 1,3-bis-/(hydroxyalkyl(aryl)/-tetraorganodisiloxanes, which comprises, according to the invention, reacting diorganohalosilanes with unsaturated alcohols in the presence of a tertiary amine as hydrogen chloride acceptor and in an organic solvent medium, followed by subjecting the resultant alkenyloxydiorganosilanes to polymerization in the presence of a hydrosilylation catalyst, boiling the mixture of siloxyalkanes thus obtained with a solution of alkali, and thereafter separating the desired products.

It is expedient to resort to dimethylchlorosilane as the diorganohalosilane, but use can also be made of diphenylchlorosilane, methylphenylchlorosilane, etc.

To carry out the reaction, recourse may be had to the following unsaturated alcohols: linear aliphatic alcohols, e.g. allyl alcohol; branched aliphatic alcohols, e.g. methallyl alcohol; acetylenic alcohols, e.g. propargyl alcohol, and aromatic alcohols, e.g. o-allylphenol.

The preferred tertiary amine is dimethylaniline, but it is also feasible to use diethylaniline, triethylamine, etc.

It is good practice to employ such organic solvents as white spirit, dibutyl ether or diethyl ether.

To carry out the hydrosilylation reaction, it is expedient to employ a 0.1 N solution of chloroplatinic acid in isopropanol as catalyst.

The polymerization should be conducted at a temperature of 185°–210° C. in order to accelerate the conversion of alkenyloxydiorganosilanes to polysiloxanes and to make the conversion more complete.

The alkaline treatment of the resultant polysiloxyalkanes may best be accomplished by boiling said mixture with a 10–30 percent solution of sodium hydroxide for a period of 5 hours.

The interaction of diorganohalodisilanes with unsaturated alcohols may be effected in the absence of tertiary amines, but under these conditions the duration of the reaction increases.

The compounds, prepared according to the method of the present invention, are represented by the following general formula:

$$\left[ HORSi(R_1)(R_2) \right]_2 O$$

wherein: $R_1$ and $R_2$ stand for alkyl or aryl radicals and may be identical ($R_1=R_2$);

R is a divalent saturated or unsaturated branched aliphatic radical or alkyl aromatic radical.

The exemplary compounds represented by the above formula are: 1,3-bis-(2-methyl-3-hydroxypropyl)-1,1,3,3,-tetramethyldisiloxane, 1,3-bis/(γ-ortho-hydroxyphenyl)-propyl/-1,1,3,3-tetramethyldisiloxane, 1,3-bis-(3-hydroxapropenyl-2)-1,1,3,3,-tetramethyldisiloxane.

The present method is advantageous in that the manufacturing process is simple, the starting compounds are readily available, and the desired compounds are obtained in a quantitative yield (80–90 percent).

The method according to the present invention is accomplished as follows.

Into a three-necked flask fitted with a stirrer, a reflux condenser and a dropping funnel are charged diorganohalosilane, tertiary amine and organic solvent, and to the stirred mixture is added unsaturated alcohol, the resultant mixture is stirred and allowed to stand until the formation of the tertiary amine hydrochloride is complete. The hydrochloric salt is filtered off and washed with organic solvent, whilst the filtrate is distilled to separate the alkenyloxydiorganosilane.

Into another flask fitted with a stirrer, a thermometer, a condenser and a dropping funnel is charged a part of the alkenyloxydiorganosilane and a small amount of the hydrosilylation catalyst. The mixture is stirred and heated until it begins to boil. Then into the flask is introduced the remaining alkenyloxydiorganosilane and the temperature of the reaction mixture is maintained at 185°–210° C. to effect polymerization, followed by adding a 10–30 percent alkaline solution and boiling the stirred reaction mixture for a period of 5 hours. To remove the alkali from the desired product, the reaction mixture is washed twice with a 10 percent acid solution and once with water.

The reaction proceeds according to the following schematic equation:

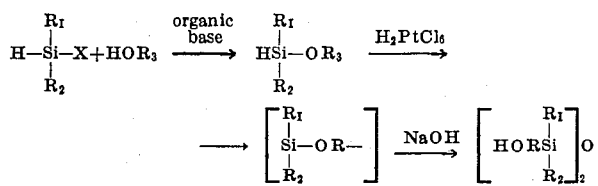

wherein: $R_1$ and $R_2$ stand for alkyl or aryl radicals and $R_1$ may be identical to $R_2$ ($R_1=R_2$);

R is a divalent organic linear or branched, saturated or unsaturated aliphatic or alkylaromatic radical;

$R_3$ is an organic unsaturated radical containing at least one carbon-carbon double bond;

X stands for a halogen, and $n$ 1.

For a better understanding of the present invention, the following examples are presented by way of illustration.

EXAMPLE 1.

Synthesis of 1,3-bis-(3-Hydroxypropyl)-1,1,3,3-Tetramethyldisiloxane.

Into a reaction flask are placed 3,000 g. of dibutyl ether, 1,430 g. (15.1 moles) of dimethylchlorosilane and 1,830 g. (15.1 moles) of dimethylaniline, and to the stirred contents of the flask is added 871 g. (15 moles) of allyl alcohol for a period of 4 hours.

The reaction mixture is stirred for 8 hours at room temperature and allowed to stand for a period of 12 hours. There forms the precipitate of dimethylaniline hydrochloride which is filtered off and washed with dibutyl ether. The filtrate is distilled to yield 1,405 g. of dimethylallyloxysilane (86 percent of the theoretical); m.p. 83°–84° C./756 mm. Hg; $n_D^{20}$ 1.3945; $d_4^{20}$ 0.7889.

$MR_D$ 35.29; $MR_{calcd.}$ 35.38

Analysis, percent: Found: C,51.19, 51.55 H,10.15; 10.3

Calcd. for $C_5H_{12}SiO$: C,51.66; H,10.44

To carry out the polymerization step, 10 ml. of dimethylallyloxysilane is placed in a 2-liter flask and to it is added 2 drops of a 0.1N solution of chloroplatinic acid in isopropanol, and the contents of the flask are stirred and heated to boiling and the temperature in the flask rises to 120° C. Next the reaction mixture is heated to a temperature of 185°–210° C. while adding thereto the rest of the dimethylallyloxysilane. The polymerization yields 1,405 g. of a yellowish viscous mass consisting of a mixture of siloxyalkanes.

Seventy-seven g. of the mixture of siloxyalkanes and 100 ml. of a 20 percent solution of sodium hydroxide are placed in a 1-liter flask, and the stirred reaction mixture is boiled for 5 hours and thereafter allowed to cool down to room temperature. Two 100 ml. portions of 10 percent sulfuric acid are added to the stirred reaction mixture On standing, the reaction mixture separates into two layers, viz, an upper organic layer and a lower aqueous layer. The aqueous layer is discarded, whilst the organic layer is washed with 100 ml. of water. The washed product is dried over calcium chloride. There is obtained 78.4 g. (95 percent of the theoretical amount) of the desired compound; b.p. 85°–86° C./40 mm. $n_D^{20}$ 1.4772; $d_4^{20}$ 0.9539; $MR_D$ 70.29; $MR_{calcd.}$ 70.38

Analysis, Percent Found: C48.20, 48.39; H10.47, 10.40; Si22.81, 21.73; OH,13.7, 13.6 Mol. weight 248.

Calcd. for $C_{10}H_{26}Si_2O_3$; C47.94, HI,0.46; Si,22.42; OH,13.6 Mol. weight 250.

EXAMPLE 2.

Synthesis of 1,3-bis-(Methyl-3-Hydroxypropyl)=1,1,3,3-Tetramethyldisiloxane

Into a three-necked flask are charged 94.6 g. (1.0 mole) of dimethylchlorosilane, 121.1 g. (1.0 mole) of dimethylaniline and 700 ml. of diethyl ether, and to the contents of the flask is added dropwise 72.1 g. (1 mole) of methallyl alcohol. The reaction mixture is maintained at room temperature for a period of 12 hours, and the dimethylaniline hydrochloride formed is filtered off and washed with several portions of fresh diethyl ether. The filtrate is distilled to yield 107.0 g. (81.5 percent of the theoretical amount) of dimethylmethallyloxysilane; b.p. 105°–106° C./745 mm. Hg; $n_D^{20}$ 1.4038; $d_4^{20}$ 0.7958; $MR_D$ 40.00; $MR_{calcd.}$ 40.09

Found, Percent: Si-H=0.79

Calcd. for $C_5H_{12}SiO$, percent: Si-H,0.77

Next 107.0 g. of dimethylmethallyloxysilane is subjected to polymerization by following the procedure of example 1, and the resultant polymerized mass is boiled for 5 hours in the presence of 20 percent sodium hydroxide solution. The hydrolyzate is treated with sulfuric acid to remove the alkali and dried. The yield of the desired product is 107 g. (95 percent of the theoretical amount).

$n_D^{20}$ 1.4530; $d_4^{20}$ 0.9448; $MR_D$ 79.65; $MR_{calcd.}$ 79.68. Analysis, Percent: Found: H,10.91, 10.76; C,53.03, 52.50; Si,20.43, 19.88; OH,11.86, 11.76 Calcd. for $C_{10}H_{26}Si_2O_3$: H,10.86; C,51.9; Si,20.20; OH,11.86

EXAMPLE 3.

Synthesis of 1,3-bis /( =-ortho-Hydroxyphenyl)=Propyl/-1,1,3,3ay-Tetramethyldisiloxane Into a three-necked flask are charged 94.6 g. (1.0 mole) of dimethylchlorosilane, 121.1 g. (1.0 mole) of dimethylaniline and 700 ml. of diethyl ether, and to the contents of the flask is added dropwise for a period of 3 hours 134.17 g. (1 mole) of o-allylphenol. The reaction mixture is maintained for 12 hours at room temperature, followed by filtering off the precipitate of dimethylaniline hydrochloride and washing it with 250 ml. of fresh diethyl ether taken in several portions. The filtrate is distilled to give 161.63 g. (84.1 percent of the theoretical amount) of dimethylsilylortho-allylphenate; b.p. 57°–58° C./2 mm; $n_D^{20}$ 1.4982; $d_4^{20}$ 0.9365; $MR_D$ 60.14 $MR_{calcd.}$ 59.84 Analysis, Percent. Found: C,69.39; H,8.33 Calcd. for $C_{11}H_{16}SiO$: C,68.69; H 8.38 161.63 g. of dimethylsilylortho-allylphenate is subjected to polymerization as described in example 1, followed by treating the polymerized mass with a 20 percent sodium hydroxide solution. The hydrolyzate is then treated with sulfuric acid to remove the alkali and dried to yield 160 g. (94.6 percent of the theoretical amount) of the desired product. $n_D^{20}$ 1.5242; $d_4^{20}$ 1.0295; $MR_D$ 119.70; $MR_{calcd.}$ 119.16 Analysis, Percent. Found: C,65.82, 65.70; H, 8.59, 8.60; Si, 13.84, 13.99 Calcd. for $C_{22}H_{34}Si_2O_3$: C,65.61; H, 8.51; Si, 11.92; OH, 8.44

EXAMPLE 4.

Synthesis of 1,3-bis-(3-Hydroxypropenyl-2)-1,1,3,3=Tetramethyldisiloxane

Into a three-necked flask are charged 94.6 g. (1.0 mole) of dimethylchlorosilane, 121.12 g. (1 mole) of dimethylaniline and 700 ml. of white spirit, and to the contents of the flask is added dropwise for a period of 3 hours 56.06 g. (1 mole) of propargyl alcohol. The reaction mixture is maintained at room temperature for 12 hours, and the precipitate of dimethylaniline hydrochloride is filtered off and washed with several portions of diethyl ether (250 ml.). The filtrate yields on distillation 104.77 g. (89.2 percent of the theoretical amount) of propinyloxydimethylsilane; b.p. 93°–94° C./750 mm; $n_D^{20}$ 1.4112; $d_4^{20}$ 0.8544; $MR_D$ 33.2; $MR_{calcd.}$ 33.74

Found Percent: SI–H=0.85 Calcd. for $C_5H_{10}SiO$, Percent: SI–H, 0.89

104.77 g. of propinyloxydimethylsilane is subjected to polymerization as disclosed in example 1, followed by hydrolyzing the polymerized mass with a 30 percent sodium hydroxide solution. The hydrolyzate is then treated with sulfuric acid to remove the alkali and dried to yield 105.9 g. (93.7 percent) of the theoretical amount) of the desired compound. $n_D^{20}$ 1.4480; $d_4^{20}$ 0.9215; $MR_D$ 71.16; $MR_{calcd.}$ 71.01 Analysis, Percent. Found; C,48.01, 48.93; H, 9.01, 9.12; Si, 22.68, 22.70; OH, 13.81; 13.90 Calcd. for $C_{10}H_{22}Si_2O_3$: C, 48.73, H, 8.99; Si, 22.78; OH, 13.79

We claim:
1. A method of preparing compounds having the general formula

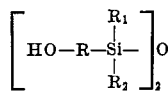

wherein $R_1$ and $R_2$ are lower alkyl or phenyl groups and may be identical and R is a divalent saturated or unsaturated linear or branched aliphatic radical or alkyl aromatic radical which comprises reacting a diorganohalosilane having the general formula

wherein X is halogen and $R_1$ and $R_2$ are as defined above with an unsaturated hydroxy compound selected from the group consisting of allyl alcohol, methallyl alcohol, propargyl alcohol and o-allylphenol in the presence of a tertiary amine as hydrogen chloride acceptor and in an organic solvent medium, polymerizing the resultant alkenyloxydiorganosilanes in the presence of chloroplatinic acid as a hydrosilylation catalyst, boiling the mixture of siloxyalkanes thus obtained with a 10–30 percent solution of alkali metal hydroxide and separating the desired compound.

2. A method according to claim 1, wherein the diorganohalosilane is dimethylechlorosilane.
3. A method according to claim 1, wherein the unsaturated hydroxy compound is allyl alcohol.
4. A method according to claim 1, wherein the unsaturated hydroxy compound is methallyl alcohol.
5. A method according to claim 1, wherein the unsaturated hydroxy compound is propargyl alcohol.
6. A method according to claim 1, wherein the unsaturated hydroxy compound is orthoallylphenol.
7. A method according to claim 1, wherein the tertiary amine is dimethylaniline.
8. A method according to claim 1, wherein the organic solvent is white spirit.
9. A method according to claim 1, wherein the organic solvent is dibutyl ether.
10. A method according to claim 1, wherein the organic solvent is diethyl ether.
11. A method according to claim 1, wherein the hydrosilylation catalyst is a 0.1N solution of chloroplatinic acid in isopropanol.
12. A method according to claim 1, wherein the polymerization is carried out at a temperature of 185°–210° C.
13. A method according to claim 1, wherein the mixture of siloxyalkanes is boiled with a 10–30 percent solution of sodium hydroxide for a period of 5 hours.

* * * * *